United States Patent [19]
Duve

[11] Patent Number: 5,827,561
[45] Date of Patent: Oct. 27, 1998

[54] PROCESS FOR PRODUCING MEAT STRIPS OR PROTEINACEOUS STRIPS

[76] Inventor: Manfred Duve, Ebbetalstrasse 15, D-58840 Plettenberg, Germany

[21] Appl. No.: 788,685

[22] Filed: Jan. 24, 1997

Related U.S. Application Data

[63] Continuation-in-part of Ser. No. 547,678, Oct. 17, 1995, abandoned, which is a continuation-in-part of Ser. No. 272,140, Jul. 8, 1994, Pat. No. 5,482,730.

[51] Int. Cl.[6] .................................. A23J 3/04; A23J 3/14; A23L 1/317; A23P 1/12
[52] U.S. Cl. ........................ 426/513; 426/516; 426/518; 426/523; 426/524
[58] Field of Search ................................... 426/412, 413, 426/513, 516, 646, 518, 523, 524; 99/470; 83/909, 913, 950; 225/3

[56] References Cited

U.S. PATENT DOCUMENTS

| | | | |
|---|---|---|---|
| 3,223,531 | 12/1965 | Kugler et al. | 426/523 |
| 4,058,633 | 11/1977 | Staff et al. | 426/646 X |
| 4,239,785 | 12/1980 | Roth | 426/646 X |
| 4,258,066 | 3/1981 | Bernard | 426/646 X |
| 4,450,183 | 5/1984 | Steinberg et al. | 426/646 |
| 4,567,051 | 1/1986 | Baker et al. | 426/516 X |
| 4,614,489 | 9/1986 | Juravic | 426/516 X |
| 4,800,094 | 1/1989 | Freda et al. | 426/516 X |

*Primary Examiner*—Arthur L. Corbin
*Attorney, Agent, or Firm*—Collard & Roe, P.C.

[57] ABSTRACT

In a process for producing a food product based on meat, animal proteins or vegetable protein, an emulsion is prepared from base components by first comminuting and emulsifying the base components. In the next processing step, the emulsion is loaded into a stuffing device, from which the emulsion then exits in the form of a single strand or numerous parallel strands. In a further step, the strands of the emulsion are cooked. The cooked strands of the emulsion are then cut by a cutting device into shorter strips, preferably having a length of a few centimeters, and the strips are subsequently deep-frozen and then packaged.

8 Claims, 3 Drawing Sheets

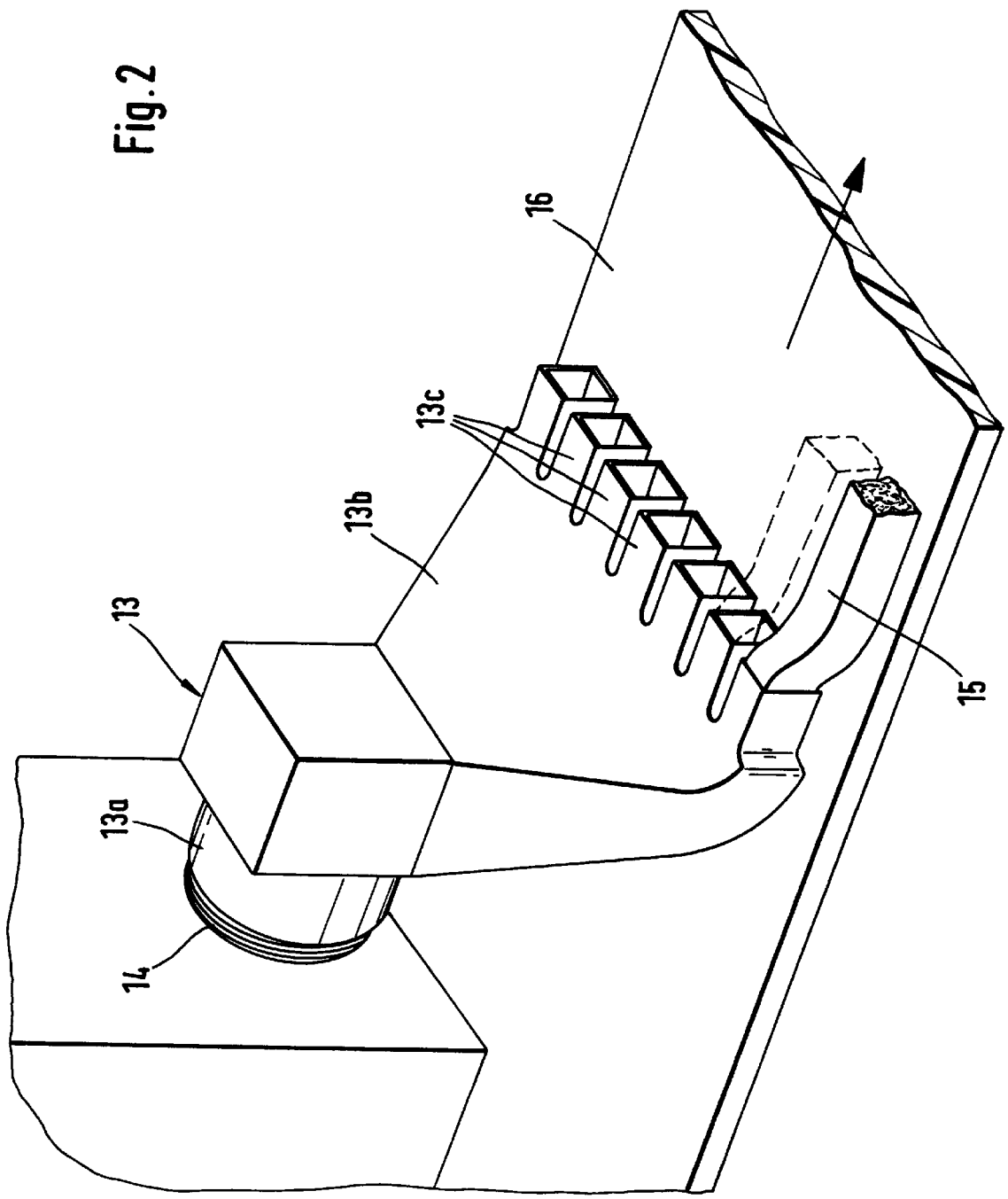

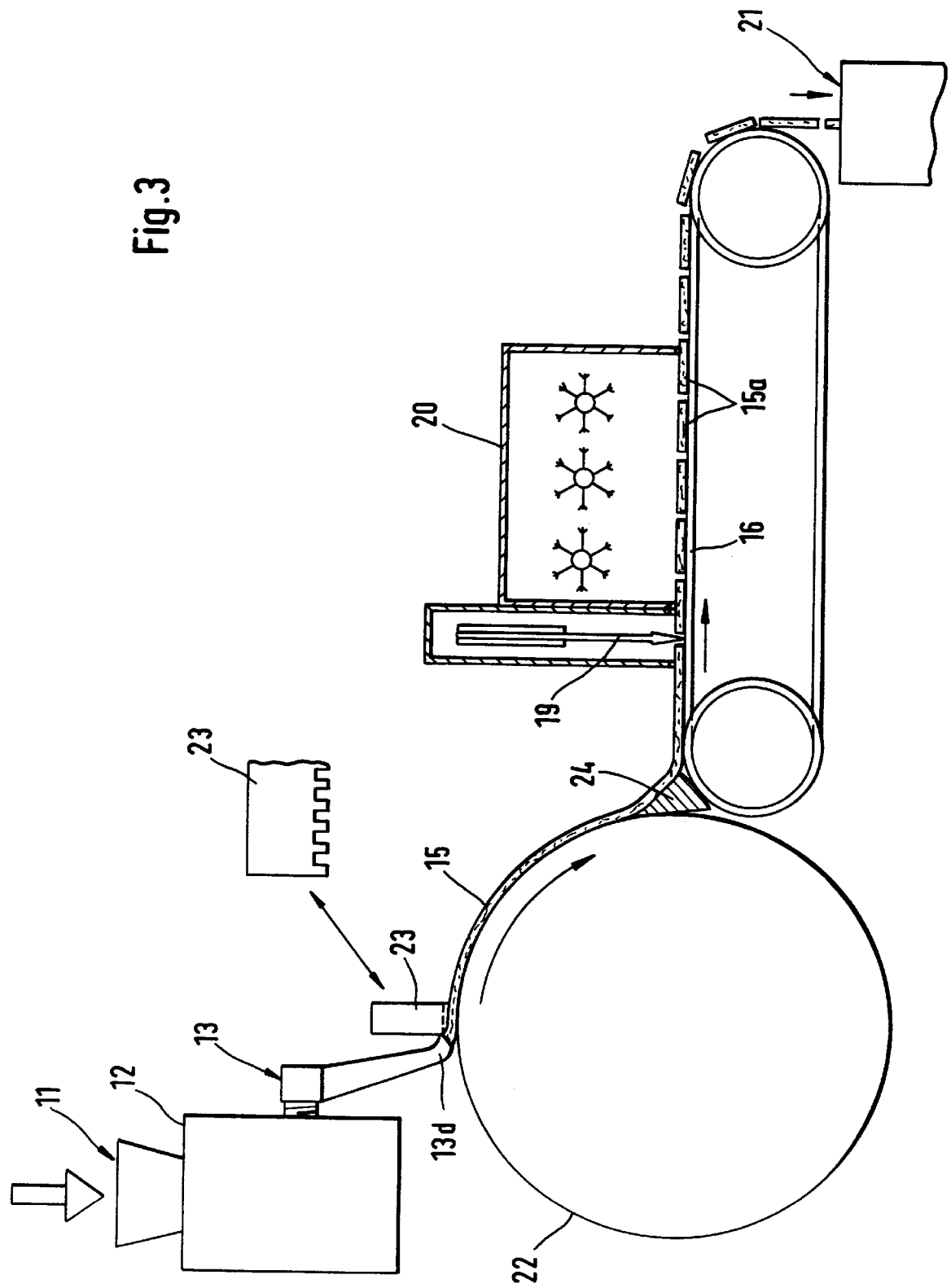

PROCESS FOR PRODUCING MEAT STRIPS OR PROTEINACEOUS STRIPS

CROSS-REFERENCE TO RELATED APPLICATION

This is a Continuation-in-Part Application of U.S. patent application Ser. No. 08/547,678 filed on Oct. 17, 1995, now abandoned, which is a Continuation-in-Part Application of U.S. patent application Ser. No. 08/272,140 filed on Jul. 8, 1994, now U.S. Pat. No. 5,482,730.

BACKGROUND OF THE INVENTION

1. Field of the Invention

The present invention relates to a process for producing a food product based on meat or proteins of animal or vegetable origin.

2. The Prior Art

A process for producing a food product based on meat is already described in EP-A 0 624 320. This finished product preferably has the form of stick-like strips, cubes or the like, and thus preferably has the appearance of French fried potatoes. However, it is not produced from potatoes but from meat emulsion. This known process has the drawback that the manufacture of the product is fairly expensive, since the meat normally used for emulsions as well as the technology to manufacture the product are very costly.

SUMMARY OF THE INVENTION

It is therefore an object of the present invention to overcome the drawbacks of the prior art and to create a process which, on the one hand, leads to a food product which is similar in appearance and flavor properties to the aforementioned product, but which, on the other hand, permits a production of the food product on a large, particularly on an industrial scale at favorable cost. One idea according to the invention is to use meat of lesser grade, or other proteins of animal or vegetable origin. Furthermore, within the framework of the present invention, the process is carried out in such a way that it is suitable for an efficient, large scale industrial production.

In addition to pork, beef, lamb or veal, beef fat, poultry, in particular chicken or turkey, poultry fat, poultry skin, pork fat, mechanically deboned poultry meat, fat emulsions consisting of fat, water and binders, vegetable or animal oils, game, horse meat, or fish may be used.

In addition to meat or meat substitutes, it is possible to use proteins of animal or plant origin in powder or liquid form. Furthermore, it is possible to use algae proteins, (i.e. Carrageenan). In addition, grain products, such as rice, corn, soybean or other types of grain can be used in powder form or as granulates. Furthermore, it is possible to add modified starches, binders or fillers permitted under the food laws in the respective countries where the product is sold.

Further additives, which may be added either at the beginning or during the manufacturing process, could be phosphates, citrates, acetates, carbohydrates, modified starches, preservatives, binders and other additives or fillers permitted or in the process of being permitted, under the food laws in the countries where the product is sold. Furthermore, salt and/or spices and/or flavorings are usually added, depending on the desired flavor and desired properties of the final product, the percentages of the various meat components, other proteins and additives specified as above, may vary within a wide range.

The first processing step is the manufacturing of a fine or coarse emulsion made from the above-mentioned components. There are various methods, technologies and equipment available for the manufacturing of such emulsions. For example, a so-called silent cutter which is commonly used for meat processing, may be used. As an alternative, a colloid mill (mince-master), a silent cutter with a mixing gear or other blending or mixing devices which comminute the various components and extract the protein, can be used.

According to the invention, this raw emulsion is pushed through a filling horn by means of a vacuum stuffer, a conveying screw or a pump for pumping solids. Said horn widens and has several square or round outlets. This emulsion is stuffed through this stuffing horn in one strand with uniform speed on to a conveyor belt and is preferably hot-air processed in a type of tunnel through which the conveyor belt passes.

As an alternative, this raw emulsion can also be heat processed by passing it on a conveyor belt through a hot water bath (70°–80° C.). After the hot air cooking process or the hot water cooking process, the strip-shaped strand of emulsion transported by means of a conveyor belt, is cut to the desired length with the help of a cutting device, such as a guillotine knife. Afterwards, the conveyor belt with the cut strips passes through a freeze tunnel, and the strips that already have the shape similar to French Fries are shock frosted or i.q.f (individually quick frozen). This is done with the help of liquid nitrogen, emitted into the freeze tunnel through suitable nozzles.

An alternative process for the invention is the stuffing of the raw emulsion through a stuffing horn having such a shape that the emulsion exits in the form of a wide flat strand having a width of, for example 60 to 80 cm. This flat strand of raw emulsion is then transferred on to a heated rotating roll coated with a non-stick coating where it is uniformly distributed. The speed of the roll is accelerated or slowed down depending on the thickness of the raw emulsion received on said roll. This ensures that the raw emulsion is uniformly cooked on the surface of the roll.

After the raw emulsion has passed through cooking zone on the roll, it is deposited on a conveyor belt by means of a scraper. There, the cooked emulsion is cooled in a cooling tunnel or by gassing it with nitrogen. Thereafter, the cooled emulsion is run against slanted, standing or moving blades, so that endless strips of the cooked emulsion are obtained.

These strands are then transported further on the conveyor belt to be precision cut by a guillotine blade or a cutting wire, which is fastened on to a beam which lowers and raises the blade or wire to ensure that consistent sized pieces, similar to French Fries, are cut at all times.

As a further alternative, according to the invention, it is also possible to first stuff the raw emulsion in natural or artificial sausage casings, which are then cooked in steam or hot water. The cooked product is subsequently cooled in cold water or in a cooler before the casing is removed. The cooked emulsion can now be cut by one of the previously described cutting methods. It is also possible to use a so-called universal cutter or a cutter commonly used for dicing of processed meats or to cut strips of pork back fat.

Further processing of the cooked product produced according to the above-mentioned process comprises, as a rule of, shock-frosting, for example in a freeze tunnel, and subsequent automatic portion packaging in containers of a suitable type, for example, plastic pouches or the like. Said type of further processing and packaging is suitable if the product is intended for fast-food outlets or for food service applications, where the product is usually deep-fried before consumption.

If the meat product according to the invention is also intended for the consumer, said product can also be sold in the same or similar fashion, subsequently be deep-fried or baked.

Alternatively, after the cooking process and following cooling only, it is also possible to spray the surface of the product with carbohydrate solutions or related substances in order to obtain uniform browning during deep frying or baking. Subsequently, the product can now be shock frosted or (i.q.f) and sold portion packed (i.e. in pouches). As already mentioned, the product can also be baked or processed in a convection oven by the consumer, instead of deep frying.

According to a variation of the invention, the product also can be breaded prior to or after cooking, or coated with another type of coating.

BRIEF DESCRIPTION OF THE DRAWINGS

Other objects and features of the present invention will become apparent from the following detailed description considered in connection with the accompanying drawings which disclose several embodiments of the present invention. It should be understood, however, that the drawings are designed for the purpose of illustration only and not as a definition of the limits of the invention.

FIG. 2 shows an enlarged, perspective detail view of the stuffing device used for the process according to FIG. 1; and FIG. 3 shows a schematically simplified lateral view of another variation of process for producing a food product according to the invention.

DETAILED DESCRIPTION OF PREFERRED EMBODIMENTS

Figure 1:
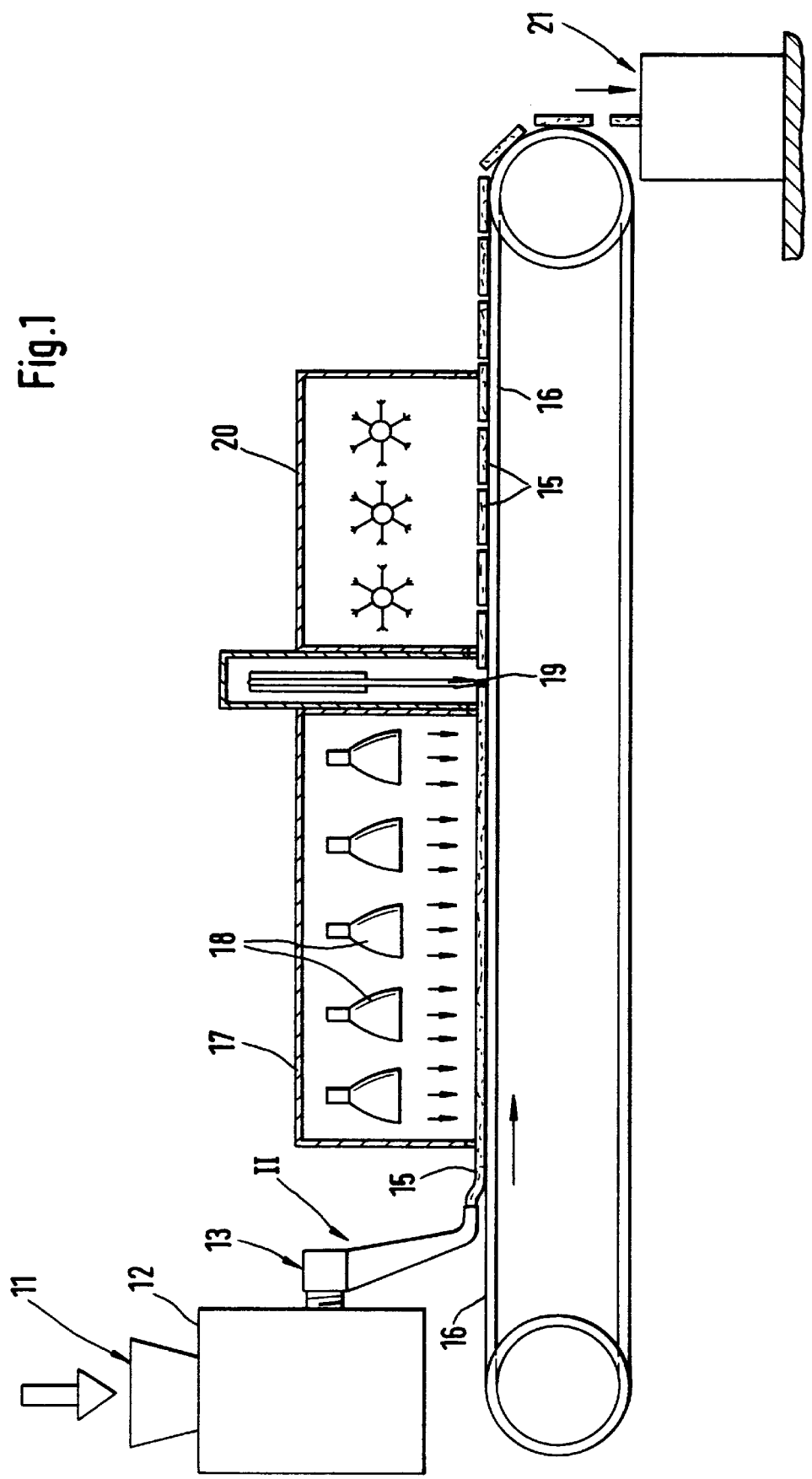
FIG. 1 shows a schematically simplified view of one variation of the process according to the invention for producing the food product.

Reference is made also to the drawings and the further processing of the raw emulsion obtained by the cutting process is explained as follows.

In connection with the process according to the variation according to FIG. 1, the emulsion previously prepared by cutting is loaded into the stuffer opening 11 of the stuffing device 12 in the direction of the arrow. The stuffing device 12 can be constructed in such a way that the emulsion, which was loaded into the hopper, is further transported by vacuum pump and then passed via an opening into the outlet 13. Said outlet 13 of the stuffing device is shown again perspectively in detail in FIG. 2. The outlet 13 comprises a screw attachment 13a screwable into a thread 14, so that the outlet 13, when required, can be unscrewed and replaced.

The emulsion is passed through a short tubular pipe (which is part of the screw attachment 13a) into the lower part 13b of the outlet. This lower part, as can be seen in FIG. 2, gradually conically widens downwardly and forwardly, and at the end side branches into a number of parallel, spaced-apart ducts 13c, which have a squared contour in the present case, but which also can be round. Said ducts 13c are the outlet ducts via which the individual, strip-like strands of the emulsion 15 exit from the outlet of the filling device. In their end zones, the outlet ducts 13c are preferably aligned horizontally and located relatively close to the top of the conveyor belt 16, so that the strands of the raw emulsion 15 are continuously deposited on the conveyor belt 16 without tearing, said conveyor belt moving in the direction of the arrow. Furthermore, in this connection, it is necessary to ensure that the spacing of the individual outlet ducts 13c are selected far enough apart so that the individual parallel strands 15 of the raw emulsion are subsequently deposited next to each other with an adequate spacing from each other, and that such strands do not come into contact with each other, so that they can not stick together.

In the following, reference is made again to FIG. 1. The raw emulsion deposited in parallel strip-like strands laid next to one another, are now transported via the conveyor belt 16 into a tunnel 17, in which it is cooked. The tunnel 17 contains a number of hot air blowers 18, which are preferably arranged above the raw emulsion and blow hot air onto the raw emulsion in order to cook the emulsion. After exiting the tunnel 17, a conveyor belt 16 transports the strands 15 of the now cooked emulsion to a cutting device such as a guillotine knife 19. This guillotine knife moves vertically from the top downwards and cuts through each of the strands 15 across the total width of the belt, cutting each of the strands 15, which are located next to each other. Therefore, with each cut, all strip-like strands 15 of the now cooked emulsion are separated into shorter sections, whereby the length of said sections preferably already corresponds with the length of the meat fries to be produced from the cooked emulsion. This means that the length of the meat fries 15a after the cutting process preferably comes to a few centimeters. Thereafter, the cut meat fries are transported through a freeze tunnel 20. Said freeze tunnel 20 operated, for example, in such a way that liquid nitrogen is blown on to the cut meat fries 15a, so that the latter are deep-frozen. Subsequently, the deep-frozen meat fries 15a are transported via the conveyor belt 16 from the freeze tunnel 20 and then preferably are directly received in a packaging station 21, the function of which is not explained here in greater detail. In the packaging station 21, the meat fries 15 are preferably packaged airtight and in a durable way.

An alternative variation of the process according to the invention is explained as follows by reference to FIG. 3. In this case as well, provision is made for a filling station 12 with a filling opening 11, into which the emulsion is loaded the same way as previously described. The outlet 13 of the filling device is, in the upper part, similar to the one shown in FIG. 2. However, for outlet 13 according to FIG. 3, no provision has been made for individual outlet ducts 13c as seen in FIG. 2. The outlet in FIG. 3 has no branching at the end or outlet side, but rather consists of one single duct 13d extending across the width. The height and width may be similar to the design shown for the device 13 according to FIG. 2. Therefore, a flat, wide strand 15 of the raw emulsion exits from said outlet duct 13.

Strand 15 of the raw emulsion is received on the hot surface of a heatable roll 22 rotating clockwise in the drawing according to FIG. 3, and is located shortly below the outlet 13d. It can be seen in the drawing that a toothed comb-like stripping device 23 is situated immediately after the outlet 13d above the roll. This stripping device is shown again by a front view in the drawing according to FIG. 3. Toothed comb-like stripping device 23 guarantees the separation of strand 15 of the raw emulsion in individual narrow strands placed parallel next to each other. Stripping device 23 also ensures that strands 15 of the frying product do not exceed a certain height.

On the hot surface of the roll 22, which continues to rotate and transport the raw emulsion 15, the individual parallel strands of the raw emulsion are now cooked uniformly. After approximately one quarter rotation of the roll, the cooking process is completed and the parallel individual strands 15 of the now cooked emulsion are transported via a transition piece 24 onto a conveyor belt 16. The strands 15 of the cooked emulsion are then further transported by the conveyor belt 16 in the direction of the arrow and pass through a cutting device in the form of a guillotine knife 19 similar to the one in FIG. 1. Here, they are cut into individual shorter strands having the length of the meat fries 15a and are received in the freeze tunnel 20 by means of the conveyor belt. In freeze tunnel 20, they are deep-frozen with the help of liquid nitrogen as described in the process in connection with FIG. 1, and finally received in the packaging station 21, where they are packaged airtight.

EXAMPLE 1

To begin with, a very fine batch of emulsion is cut i.e. 100 kg of raw emulsion with the ingredients specified below, in order to produce a fine raw emulsion based on poultry meat.

| | |
|---|---|
| 40 kg | poultry meat |
| 20 kg | poultry skin |
| 15 kg | ice |
| 10 kg | soy flour |
| 10 kg | Mechanically deboned poultry meat |
| 5 kg | salt, spices, cutting aides and other ingredients |

Before processing the meat in the silent cutter, it is advisable to pre-grind the well-chilled meat as well as the poultry skin, (which can even be slightly frozen).

For manufacturing of the fine emulsion, the various meat and ingredient components are either added at once or in steps during the cutting process in the silent cutter. To control the temperature of the emulsion in process, crushed ice or ice snow is added at intervals. This is necessary since friction created by the high speed cutter knives and subsequent rise in temperature could cause the denaturation and coagulation of valuable meat protein. The cutting process is controlled by means of a precise thermometer in such a way that the temperature of the emulsion in the course of the cutting process is below 10° C., preferably in the range of between 0° C. and 10° C. The entire cutting process may take a few minutes depending on the type of meats being used, the total batch size, the size of silent cutter used and also the bowl-and knife speed selected for processing. The end of the cutting process is recognized by the expert in the field by the consistency of the emulsion. It is advisable to monitor the progress of the emulsion during the cutting process.

After the cutting process has been completed, the fine emulsion so obtained is transferred into the filling device, preferably a so-called vacuum stuffer equipped with a stuffing horn. Alternatively, however, a portion of the pre-ground 40 kg of poultry meat (ground through a grinder plate larger than ⅛") can be held back while the rest of the meat as well as all the other ingredients are being used to make a so-called basic emulsion. Now the remaining pre-ground poultry meat is added to the emulsion and cut at slow speed in the silent cutter until the desired distribution is obtained. To retain proper particle definition, caution is advised to not cut the coarse insert too fine. Due to these coarse particles the fully cooked product would have a better and more desirable texture. The raw emulsion is then loaded into the stuffing device. The further procedure is now explained as follows.

EXAMPLE 2

Again, as a final step, a fine-cut emulsion based on poultry meat is produced. A batch of 100 kilograms of fine-cut emulsion is based on the following components:

| | |
|---|---|
| 65 kg | poultry meat |
| 15 kg | poultry skin |
| 15 kg | ice |
| 5 kg | salt, spices, cutting aids and other ingredients |

The emulsion is prepared as described in example 1. Also, further processing of the emulsion by means of the filling device and subsequent cooking and portioning are carried out in the same way as described above in example 1 by reference to the attached drawings. Therefore, the difference as opposed to example 1 lies in the different composition of the materials used for the preparation of the emulsion.

EXAMPLE 3

As a first step, a fine-cut emulsion based on poultry meat is prepared. A batch of 100 kilograms of emulsion is based on the following ingredients:

| | |
|---|---|
| 60 kg | poultry meat |
| 15 kg | pork fat |
| 15 kg | ice |
| 5 kg | carrageenan |
| 5 kg | spices, salt, cutting aids and other ingredients |

The preparation of the emulsion by means of the silent cutter is again carried out in the same way as example 1. Also, subsequent further processing of the emulsion following the cutting step is carried out according to a process described in greater detail after example 1 with reference to the attached drawings.

EXAMPLE 4

The preparation of a different emulsion is described as follows:

This emulsion is different from the food products specified in examples 1 to 3 in that game meat is now used as the main component instead of poultry meat. Basically, any desired game meat can be used depending on which flavor component is desired. Preferably, game meat that is obtainable at lower cost is used. As an example, reindeer, venison, rabbit, wild boar, red deer meat etc., could be used.

A batch of 100 kilograms fine-cut emulsion is based on the following components:

| | |
|---|---|
| 70 kg | game meat |
| 15 kg | ice |
| 10 kg | pork fat |
| 5 kg | salt, spices, cutting aids and other ingredients |

The emulsion is prepared, for example as described in example 1. Further processing of the cut emulsion by means of the filling device and subsequent cooking and portioning also is carried out as described above in example 1 by reference to the attached drawings. The difference as compared to example 1 thus lies in the different composition of the materials used for the preparation of the emulsion.

EXAMPLE 5

As a first step, an emulsion is prepared based on a mixture of pork meat and game meat. A batch of 100 kilograms of emulsion is based on the following components:

| | |
|---|---|
| 30 kg | pork meat |
| 20 kg | game meat |
| 15 kg | ice |
| 15 kg | vegetable fat (vegetable oil) |
| 10 kg | milk protein |
| 5 kg | binders |
| 5 kg | salt, spices, cutting aids and other ingredients |

The frying product is prepared, for example as described in example 1. Further processing of the cut emulsion by means of the filling device and subsequent cooking and portioning also is carried out as described above in example 1 by reference to the attached drawings. Therefore, the difference as compared to example 1 lies in the different composition of the materials used for the preparation of the emulsion.

EXAMPLE 6

As a first step, an emulsion is prepared which differs from the food products described according to examples 1 to 5, in that fish meat is used in this case as the main component. Practically, any desired fish meat from different body parts of known edible fish can be used. A batch of 100 kilograms of emulsion is prepared based on the following components:

| | |
|---|---|
| 60 kg | fish meat |
| 20 kg | vegetable fat (vegetable oil) |
| 10 kg | ice |
| 5 kg | binders |
| 5 kg | salt, spices, cutting aids and other ingredients |

The emulsion is prepared as described in example 1. Further processing of the emulsion by means of the filling device and subsequent cooking and portioning also is carried out in the way as described above in example 1 by reference to the attached drawings. Therefore, the difference as compared to example 1 lies in the different composition of the materials being used for the preparation of the emulsion.

EXAMPLE 7

In the following, a food product is prepared similar to the one in example 6, said product containing fish meat as the main component; however, the fish component is greater than the one used in example 6 and the vegetable fat component is omitted for this reason. A batch of 100 kilograms of emulsion product is based on the following components:

| | |
|---|---|
| 80 kg | fish meat |
| 10 kg | ice |
| 5 kg | soy protein |
| 5 kg | salt, spices, cutting aids and other ingredients |

The emulsion is prepared, for example as described in example 1. Further processing of the cut emulsion by means of the filling device and subsequent cooking and portioning also is carried out in the way as described above in example 1 by reference to the attached drawings. The difference as compared to example 1 thus lies in the different composition of the starting materials used for the preparation of the frying product.

EXAMPLE 8

In the present example, a food product is prepared which is processed the same way as in the preceding examples; however, the difference from the preceding examples is that the main protein component is neither meat nor fish, but is derived from soy. A batch of 100 kilograms is prepared based on the following components:

| | |
|---|---|
| 70 kg | soy flour |
| 20 kg | water |
| 5 kg | binding agent |
| 5 kg | salt, spices, cutting aids and other ingredients |

No addition of ice is required with this mixture because less heat is generated during mixing. Therefore, for regulating the water content of the food product, water can be added directly.

The emulsion is prepared as described in example 1. Further processing of the cut emulsion by means of the filling device and subsequent cooking and portioning is also carried out as described above in example 1 by reference to the attached drawings. Therefore, the difference as compared to example 1 lies in the different composition of the base materials used for the preparation of the emulsion.

EXAMPLE 9

In the following example, a food product is produced in a way similar to the procedure used in example 8, said food product containing soy flour as the main source of protein. A batch of 100 kilograms is prepared based on the following ingredients:

| | |
|---|---|
| 50 kg | soy flour |
| 20 kg | vegetable fat (vegetable oil) |
| 15 kg | water |
| 10 kg | cheese |
| 5 kg | salt, spices, cutting aids and other ingredients |

The preparation of the emulsion is carried out, for example in the way described in example 1. Further processing of the cut emulsion by means of the filling device and subsequent cooking and portioning is also carried out in the way described in example 1 by reference to the attached drawings. Therefore, the difference from example 1 lies in the different composition of the materials used in the preparation of the emulsion.

EXAMPLE 10

In the following, another food product according to the invention is described, in connection with which fish is used as the main component for the preparation of the emulsion. A batch of 100 kilograms of emulsion is prepared based on the following components:

| | |
|---|---|
| 50 kg | fish meat |
| 20 kg | vegetable fat (vegetable oil) |
| 10 kg | binders |
| 15 kg | ice |
| 5 kg | salt, spices, cutting aids and other ingredients |

The emulsion is prepared, in the way explained in example 1. Further processing of the cut emulsion by means of the filling device and subsequent cooking and portioning is also carried out in the way described in example 1 by reference to the attached drawings. The difference as compared to example 1 consequently lies in the different composition of the materials used in the preparation of the emulsion.

EXAMPLE 11

Another example of a food product according to the invention is described as follows:

This food product contains game meat as the main ingredient for the preparation of the emulsion product. A batch of 100 kilograms of emulsion is based on the following components:

| | |
|---|---|
| 40 kg | game meat |
| 20 kg | pork fat |
| 15 kg | ice |
| 10 kg | mechanically deboned meat |
| 10 kg | soy protein |
| 5 kg | salt spices, cutting aids and other ingredients |

The emulsion is prepared the same way as example 1. Further processing of the cut emulsion by means of the filling device and subsequent cooking and portioning is carried out as described in example 1 as well, by reference to the attached drawings. The difference as compared to example 1, therefore, lies in the different composition of the materials used for the preparation of the emulsion.

EXAMPLE 12

Another example of a composition according to the invention for an emulsion is specified in the following, whereby in this case, poultry meat is used as the main component for the preparation of the emulsion. A batch of 100 kilograms of emulsion is based on the following ingredients:

| | |
|---|---|
| 50 kg | poultry meat |
| 20 kg | poultry fat |
| 5 kg | mechanically deboned poultry meat |
| 5 kg | carrageenan |
| 15 kg | ice |
| 5 kg | salt, spices, cutting aids and other ingredients |

The emulsion is prepared in the same way as example 1. Further processing of the cut emulsion by means of the filling device and subsequent cooking and portioning is also carried out in the way explained above in example 1 by reference to the attached drawings. Therefore, the difference as compared to example 1 lies in the different composition of the base materials used in the preparation of the emulsion.

Accordingly, while only several embodiments of the present invention have been shown and described, it is obvious that many changes and modifications may be made thereunto without departing from the spirit and scope of the invention.

What is claimed is:

1. A process for producing a food product having base components selected from the group consisting of meat, animal protein and vegetable protein, comprising:

preparing an emulsion of said base components, by comminuting and emulsifying a base composition containing said base components;

loading said emulsion into a stuffing device having an outlet with an end zone;

forcing said emulsion through the stuffing device so that it exits from the outlet thereof in the form of at least one strand;

cooking each strand;

cutting each cooked strand with a cutting device into strips having a length of a few centimeters;

deep freezing the strips; and packaging the frozen strips.

2. A process for producing a food product according to claim 1, wherein the step of cooking takes place in a tunnel using hot air blowers.

3. A process for producing a food product according to claim 2, wherein the emulsion is transported through the tunnel on a conveyor belt and cooked with hot air in said tunnel.

4. A process for producing a food product according to claim 1, further comprising the step of depositing the emulsion, as it exits from the stuffing device, onto the surface of a hot roll, wherein the emulsion is cooked.

5. A process for producing a food product according to claim 1, wherein the emulsion exits from the outlet of the stuffing device as one strand, and further comprising separating the strand with a toothed comb-like stripping device into individual, narrow strands, and placing said narrow strands parallel to one another.

6. A process for producing a food product according to claim 1, wherein the emulsion passes through a plurality of outlet ducts in the end zone of the outlet of the stuffing device and is separated into a plurality of individual parallel strands.

7. A process for producing a food product according to claim 1, further comprising transporting the emulsion on a conveyor belt, wherein each strand of the emulsion is placed next to one another and wherein the step of cutting is accomplished with a vertically movable blade arranged above the conveyor belt.

8. A process for producing a food product according to claim 1, wherein the step of freezing comprises transporting the strips through a freeze tunnel and shock freezing the strips in said tunnel with liquid nitrogen.

* * * * *